United States Patent
Knaack et al.

(10) Patent No.: US 10,877,875 B2
(45) Date of Patent: Dec. 29, 2020

(54) SYSTEMS AND METHODS FOR AUTOMATED PROGRAMMATIC TEST GENERATION AND SOFTWARE VALIDATION

(71) Applicant: Verizon Patent and Licensing Inc., Arlington, VA (US)

(72) Inventors: Joseph B. Knaack, Cedar Park, TX (US); Steve Marshall Spencer, Austin, TX (US); Matthew W. James, Austin, TX (US); Elvin Thomas Kimzey, Austin, TX (US); Owen Pellegrin, Austin, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 136 days.

(21) Appl. No.: 16/292,918

(22) Filed: Mar. 5, 2019

(65) Prior Publication Data
US 2020/0285570 A1    Sep. 10, 2020

(51) Int. Cl.
*G06F 11/00* (2006.01)
*G06F 11/36* (2006.01)

(52) U.S. Cl.
CPC ...... *G06F 11/3688* (2013.01); *G06F 11/3684* (2013.01); *G06F 11/3692* (2013.01)

(58) Field of Classification Search
CPC ............. G06F 11/3688; G06F 11/3684; G06F 11/3692
See application file for complete search history.

(56) References Cited

U.S. PATENT DOCUMENTS

| | | | |
|---|---|---|---|
| 2003/0069907 A1* | 4/2003 | Moreau | G06Q 20/1085 715/234 |
| 2004/0025083 A1* | 2/2004 | Nanja | G06F 11/3684 714/35 |
| 2006/0059457 A1* | 3/2006 | Pandit | G06F 8/73 717/106 |
| 2013/0086558 A1* | 4/2013 | Merino | G06F 11/3688 717/128 |
| 2013/0275946 A1* | 10/2013 | Pustovit | G06F 11/3684 717/124 |
| 2015/0254171 A1* | 9/2015 | Harden | G06F 16/254 717/124 |
| 2017/0006135 A1* | 1/2017 | Siebel | H04L 69/16 |
| 2017/0331850 A1* | 11/2017 | Li | G06F 21/577 |
| 2020/0242009 A1* | 7/2020 | Webb | G06F 16/9027 |

\* cited by examiner

*Primary Examiner* — Katherine Lin

(57) ABSTRACT

A system described herein may use automated techniques to programmatically validate software-under-test ("SUT") using different sets of test cases for different functions of the SUT. The system may generate the different sets of test cases based on a selected test methodology and a self-description of the SUT function calls, function arguments, and/or argument types. The system may convert the test cases to executable-code and/or network messaging that can be used to call the SUT functions with different input combinations for the arguments and/or argument types of the SUT functions, and that can capture the output that results from each function call.

20 Claims, 7 Drawing Sheets

310-1

| P1 | P2 | P3 |
|----|----|----|
| 0  | 0  | 0  |
| 1  | 1  | 1  |

310-2

| P1 | P2 | P3 |
|----|----|----|
| 0  | 0  | 0  |
| 0  | 0  | 1  |
| 0  | 1  | 0  |
| 0  | 1  | 1  |
| 1  | 0  | 0  |
| 1  | 0  | 1  |
| 1  | 1  | 0  |
| 1  | 1  | 1  |

310-3

| P1 | P2 | P3 |
|----|----|----|
| 0  | 0  | 0  |
| 0  | 1  | 1  |
| 1  | 0  | 1  |
| 1  | 1  | 0  |

FIG. 3

SYSTEMS AND METHODS FOR AUTOMATED PROGRAMMATIC TEST GENERATION AND SOFTWARE VALIDATION

BACKGROUND

Software testing is a part of a software release cycle. Software testing may be used to verify that the released software is without bugs and/or performs in an expected manner. Software testing can be done manually and/or programmatically.

Manual testing may include a human directly interacting with the software-under-test ("SUT") via a command line, graphical, or other input interface. Programmatic testing may include writing computer code to automate the interactions with the SUT. Programmatic testing may be preferable to manual testing, because the programmatic tests can be repeatedly executed after the test code is written once, and the test cases can be more quickly executed programmatically than manually. However, writing the test code with a comprehensive set of test cases can be very time-intensive, and may be also subject to human errors.

BRIEF DESCRIPTION OF THE DRAWINGS

FIG. 3 illustrates examples of different sets of test cases that may be generated using different test methodologies in accordance with some embodiments described herein;

DETAILED DESCRIPTION OF PREFERRED EMBODIMENTS

The following detailed description refers to the accompanying drawings. The same reference numbers in different drawings may identify the same or similar elements.

Embodiments described herein may provide a test automation system ("TAS") for validation of software-under-test ("SUT") using machine-generated programmatic tests. The TAS may generate different sets of test cases for different functions of the SUT based on a self-description of the SUT function calls, function arguments, and/or argument types. The TAS may modify the test coverage by generating the different sets of test cases according to one or more test methodologies (e.g., non-combinatorial, combinatorial, pairwise, and/or other testing of the SUT). The TAS may convert the test cases into executable code that can be used to call the SUT functions with different inputs, and may determine results for each test case based on the outputs of the SUT functions.

Figure 1:
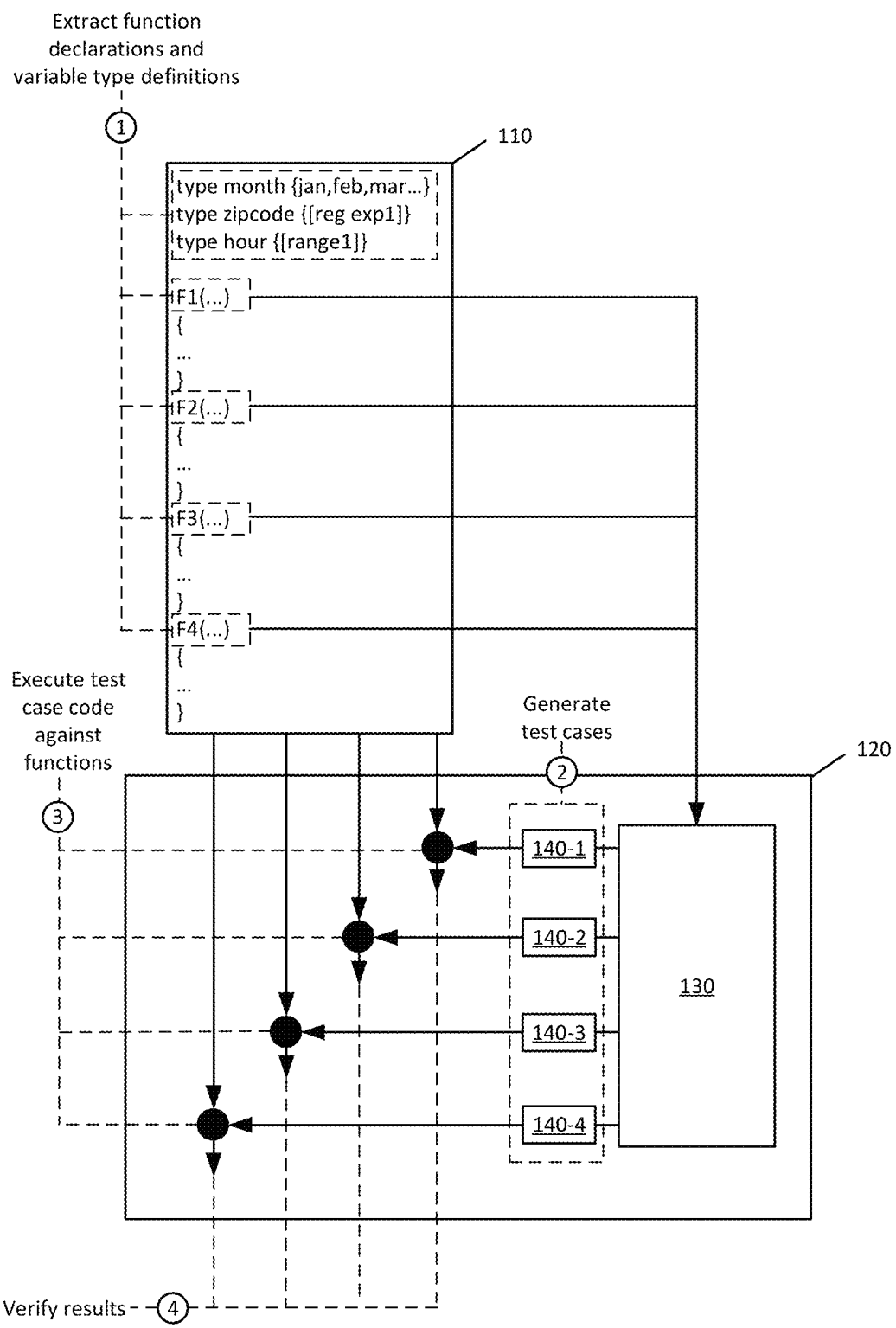
FIG. 1 illustrates an example of automated programmatic test generation and validation for software-under-test ("SUT") in accordance with some embodiments described herein.

FIG. 1 illustrates an example of the automated programmatic test generation and validation of SUT 110 in accordance with some embodiments described herein. As shown in FIG. 1, TAS 120 may automatically generate test cases based on function declarations, variable type definitions, and/or other source code of SUT 110, and may execute the automatically generated test cases against functions of SUT 110 by directly converting the test cases into executable function calls with different input combinations defined by the test cases.

For example, TAS 120 may obtain (at 1) self-description 130 of SUT 110. In some embodiments, self-description 130 may include function names, function arguments, arguments types, and/or other data related to the declaration of SUT 110 functions. In some embodiments, self-description 130 may include inputs and/or expected outputs for each of the SUT 110 functions. In some embodiments, TAS 120 may provide a self-description interface that allows a user (e.g., developer or tester) to manually define and/or modify self-description 130. Alternatively, or additionally, TAS 120 may provide a crawler for scanning SUT 110, and for automatically populating self-description 130 with function names, function arguments, arguments types, inputs, and/or other data that are detected from the scanning. The crawler may automatically populate self-description 130 based on detected function declarations and/or argument type definitions within SUT 110 source code.

TAS 120 may automatically generate (at 2) test cases 140-1, 140-2, 140-3, and 140-4 (herein sometimes collectively referred to as "test cases 140" or individually as "test case 140") based on self-description 130 and/or at least one selected test methodology. For instance, test cases 140-1 may include one or more tests for a first SUT 110 function defined in self-description 130, test cases 140-2 may include one or more tests for a different second SUT 110 function defined in self-description 130, test cases 140-3 may include one or more tests for a third SUT 110 function defined in self-description 130, and test cases 140-4 may include one or more tests for a fourth SUT 110 function defined in self-description 130. The selected test methodology may define the coverage and/or scope for each set of test cases 140. More specifically, the selected test methodology determines the input combinations that will be used to test a particular function. For instance, a first test methodology (e.g., a pairwise or all-pairs test methodology) may be used to generate test cases 140-1 with a test case for each pair of input parameters of the first SUT 110 function, whereas a second test methodology (e.g., a combinatorial test methodology) may be used to generate test cases 140-1 with a test case for every possible input combination for the first SUT 110 function. The selected test methodology can therefore be used to control the test coverage, test time, number of inputs, and/or other test factors.

Since self-description 130 may be based on function declarations (e.g., function prototypes or function definitions) within the source code of SUT 110, and may be exclusive of the actual function code, TAS 120 may generate test cases 140 in parallel or before the code for each SUT 110 function is written. For instance, TAS 120 may generate test cases 140-1 for the first SUT 110 function in response to a declaration, prototype, and/or definition of the first SUT 110 function name, arguments, and argument types, and prior to a developer writing the code for the first SUT 110 function (e.g., the source code for the operations performed when the first SUT 110 function is called).

Once the developer writes the code for one or more of the SUT 110 functions, TAS 120 may execute (at 3) a corresponding set of test cases 140 against those SUT 110 functions. In some embodiments, TAS 120 may generate SUT 110 executable test code for each test case 140. TAS 120 may generate the executable test code for test cases 140-1 directly from the function declaration of the first SUT 110 function within self-description 130 and different inputs and/or input combinations defined by the selected test methodology for each test case of test cases 140-1 without user involvement and/or a user writing a single line of executable test code. TAS 120 may programmatically and comprehensively test SUT 110 using the generated test code. For instance, TAS 120 may comprehensively test the first SUT 110 function by executing the test code generated for test cases 140-1 in order to programmatically call the first SUT 110 function with each of the different input and/or input combinations defined for test cases 140-1.

TAS 120 may record and/or validate (at 4) output for each executed test case 140. TAS 120 may validate (at 4) output by determining whether output, that is produced from testing a particular function using input from a particular test case 140, is within an acceptable range that is defined for that particular test case 140 in self-description 130.

In this manner, TAS 120 may automate the testing of SUT 110 without the user (e.g., developer or tester) writing a single line of executable test code. At most, the user may enter the function names, arguments, argument types, input ranges, and/or expected outputs in self-description 130, although TAS 120 may, on behalf of the user, automatically create and populate self-description 130 with the same data via operation of the crawler. Even without automatic creation of self-description 130, manual creation of self-description 130 is significantly faster, easier, and less error-prone than writing executable-code for a comprehensive set of test cases. Consequently, TAS 120 may shorten the software release cycle by allowing SUT 110 testing to occur in parallel with SUT 110 development, and by allowing users to focus on development instead of testing.

Figure 2:
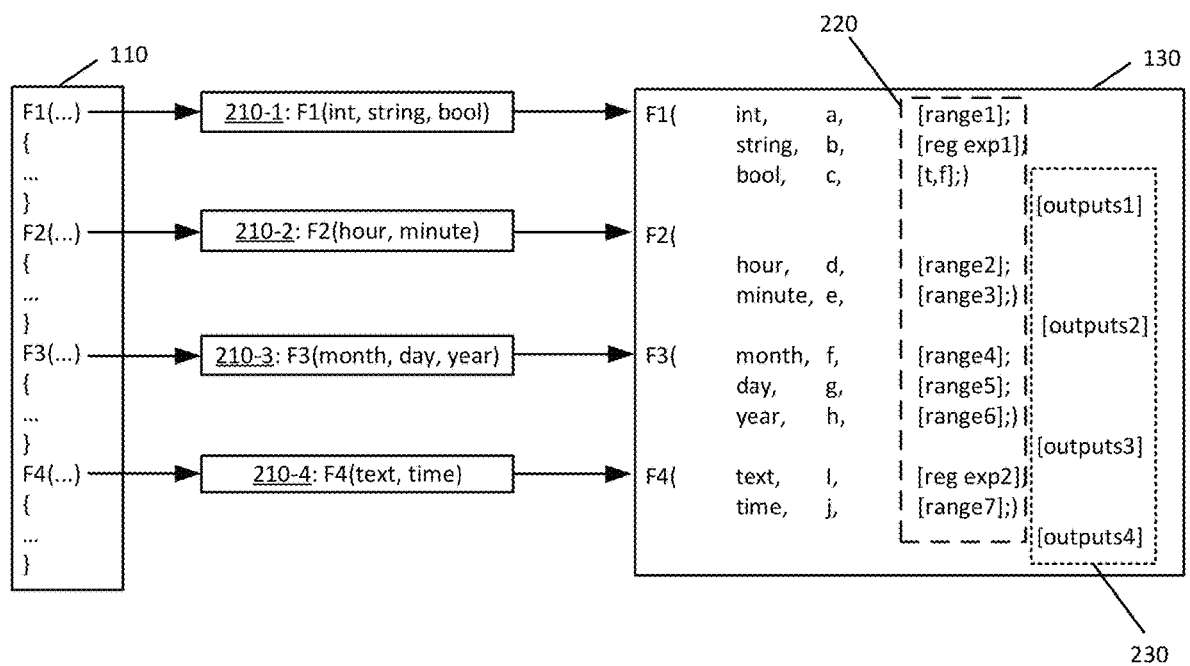
FIG. 2 illustrates an example of a self-description of the SUT in accordance with some embodiments described herein.

FIG. 2 illustrates an example of self-description 130 for SUT 110 in accordance with some embodiments described herein. As shown, self-description 130 may be based on declarations 210-1, 210-2, 210-3, and 210-4 of each SUT 110 function (herein sometimes collectively referred to as "function declarations 210" or individually as "function declaration 210").

Each function declaration 210 may contain the definition of a different SUT 110 function. For instance, each function declaration 210 may include one or more of the name and/or interface for calling a function, and/or the function parameters. The function parameters may include the arguments (e.g., the names of each function input), the type of each function argument, and/or other data. The argument type may correspond to predefined types (e.g., integer, floating point value, Boolean, string, etc.) of an underlying programming language used in writing SUT 110, and/or custom types that are unique to SUT 110 and that may be user-defined.

In some embodiments, a user may provide function declarations 210 for self-description 130 via a self-description interface of TAS 120. The user may simply copy and paste the function declarations from the source code of SUT 110 to self-description 130.

In some embodiments, TAS 120, via operation of the crawler, may automatically scan files and/or source code of SUT 110 for function declarations 210 (e.g., initialization, creation, declaration, function prototype, and/or other code with the function name, arguments, and/or argument types within SUT 110). In response to detecting a function declaration 210 in SUT 110, the crawler may automatically enter data from the detected function declaration 210 to self-description 130.

As shown in FIG. 2, self-description 130 may optionally include test inputs 220 for each function argument and/or argument type. Test inputs 220 for a particular argument and/or argument type may correspond to valid and/or invalid ranges, strings, values, regular expressions, enumerations, and/or other data that can be set for the particular argument and/or the corresponding argument type during testing. The programming language used to code SUT 110 may predefine the valid ranges, strings, values, regular expressions, enumerations, and/or other data for a particular argument or argument type. In some embodiments, a user can override or custom specify the valid ranges, strings, values, regular expressions, enumerations, and/or other data for a particular argument or argument type, and TAS 120, via operation of the crawler, may detect the user-defined inputs for the particular argument or argument type, and may update self-description 130 accordingly.

A range may be defined to include numeric values (e.g., [0-9]), characters (e.g., [a-f]), symbols, or some combination thereof. Strings may be defined to include a specific sequence of characters, and regular expressions may be defined to include a sequence of characters that define a search pattern (e.g., a five digit zip code may be represented by the regular expression "^\d{5}$"). An enumeration may be defined to list each test value for that argument and/or argument test. For instance, an argument type of "month" may be specified with valid test inputs of JAN, FEB, MAR, APR, MAY, JUN, JUL, AUG, SEP, OCT, NOV, and DEC. Invalid test inputs may also explicitly be used to, for example, test error handling operations of a function. To that effect, the example inputs of ~XYZ and ~TRS may be provided (e.g., to simulate months incorrectly specified as "XYZ" or "TRS"), where the "~" (or another symbol) indicates that these are invalid test inputs. Valid input for a particular argument and/or argument type may be input that is supported or within expected values of the particular argument and/or argument type, whereas invalid input for the particular argument and/or argument type may be input that is not supported or outside expected values of the particular argument and/or argument type.

TAS 120 may automatically define test inputs 220 for different arguments of functions in self-description 130 based on the type of the corresponding argument. For instance, an argument with a Boolean type may have predefined inputs of True and False. The programming language used to write SUT 110 may predefine test inputs 220 for different argument types (e.g., True and False for a Boolean type). TAS 120 may also automatically generate invalid inputs for the predefined argument types. For instance, TAS 120 may determine that the Boolean type has valid inputs True and False, and may therefore generate invalid input that is different than the predefined valid inputs. Similarly, TAS may determine that the predefined unsigned integer type has a valid range of inputs between 0 and 65,535, and may generate invalid input that is outside this valid range.

A user may also define and/or override inputs for different argument types within SUT 110 or directly within self-description 130. For instance, the user may define the custom argument type of "summer_months" to include valid inputs of JUN, JUL, and AUG (e.g., and not the other months of the year). TAS 120 may use the crawler to identify the definition of the "summer_months" argument type in SUT 110 source code. Based on the identified type definition, TAS 120 may include the defined valid inputs and/or invalid inputs for functions with arguments of the "summer_months" type definition. For instance, the valid inputs enumerate the defined values from the variable type definition, and the invalid inputs may include values that are different than each of the enumerated valid inputs (e.g., "~JAN", "~JUNE", etc.). In some embodiments, the user may use the self-description interface to add and/or modify test inputs 220 for different arguments and/or argument types.

Self-description 130 supports different test inputs 220 for different occurrences of the same argument type. For example, self-description 130 may include a first SUT 110 function with an argument of type "hour," and may specify a first set of test inputs 220 with a range of "1-12" for the "hour" argument type in the first SUT 110 function. Continuing with the example, self-description 130 may include a second SUT 110 function with an argument of type "hour", and may specify a second set of test inputs 220 with a range of "1-24" for the same hour argument type in the second SUT 110 function. In this case, different test inputs 220 may be specified for each argument of the "hour" argument type.

As further shown in FIG. 2, self-description may optionally include expected output 230 for a function. Expected output 230 may include ranges, strings, values, regular expressions, enumerations, and/or other data that a function is expected to return during testing. Actual function output that matches or is within range of expected output 230 may indicate that the function is operating as expected. Actual function output that does not match or is out of range of expected output 230 may indicate unexpected behavior and/or a failed test case.

TAS 120 may automatically define expected output 230 for a function based on argument types of one or more parameters that the function is expected to return. For instance, if a function is defined to return one argument of type "minute", and if SUT 110 defines the "minute" argument type as having a range between 0 and 59, then TAS 120 may populate expected output 230 for that function to be a number between 0 and 59. Expected output 230, like test inputs 220, may be predefined in SUT 110, and/or may be defined and/or overridden by a user.

Since each entry in self-description 130 corresponds to a function of SUT 110, TAS 120 may automatically update self-description 130 in response to changes made to the declaration of corresponding functions in SUT 110. For instance, if a user defines a particular function with a first set of arguments and argument types at a first time, and then changes the particular function to have a different second set of arguments and argument types, TAS 120, via operation of the crawler, may update a corresponding entry of self-description 130 accordingly. In particular, TAS 120 may create, at the first time, an entry for the particular function in self-description 130 based on the first set of arguments. TAS 120 may monitor SUT 110, may detect the changes that are made to the particular function, and may carryover those changes by modifying the entry for the particular function based on the second set of arguments and argument types. As a more specific example, a first entry in self-description 110 may correspond to a first function of SUT 110. In response to a detected change to a first argument of the first function from a first type to a different second type, TAS 120 may change the first argument type in the corresponding entry of self-description 130 to be of the second type, and/or may change test inputs 220 to reflect valid and/or invalid test inputs for arguments of the second type.

Self-description 130 may differ from SUT 110 in that self-description 130 does not include any of the function code and/or other executable code. In fact, self-description 130 can be defined and complete without any of the corresponding SUT 110 function code being written.

Moreover, test inputs 220 specified within self-description 130 may differ from input values that are supported by corresponding functions of SUT 110. For instance, SUT 110 may include a function argument of type "integer" that can be any 4-byte value, and self-description 130 may define test inputs 220 for that function argument to be in a more limited range of 0-100 (e.g., a specific subset of values falling within the 4-byte value).

TAS 120 may receive self-description 130 for any SUT 110, and may generate test cases 140 for that SUT 110 according to at least one selected test methodology. The selected test methodology may determine the number, scope, comprehensiveness, and/or other parameters of the TAS 120 generated test cases.

FIG. 3 illustrates examples of different sets of test cases 310-1, 310-2, and 310-3 (herein sometimes collectively referred to as "test cases 310" or individually as "test case 310") that may be generated by TAS 120 using different test methodologies in accordance with some embodiments described herein. Test cases 310 may be used to test a particular function that has three parameters (e.g., identified in FIG. 3 as P1, P2, and P3). In FIG. 3, each parameter may accept test inputs of 0 or 1.

TAS 120 may generate a first set of test cases 310-1 using a non-combinatorial test methodology. According to the non-combinatorial test methodology, the first set of test cases 310-1 may be used to test the particular function using one occurrence of each input value (e.g., all zeros or all ones in two different test cases, respectively, for each of P1, P2, and P3). The first set of test cases 310-1 and/or the non-combinatorial test methodology, may provide basic testing of the particular function. The basic testing may be used to determine that the particular function accepts inputs and produces output and does not crash when called. However, the first set of test cases 310-1 may be insufficient for purposes of debugging the function as errors and/or other issues may go undetected because of the minimal number of test cases that were used. For instance, the first set of test cases 310-1 do not test the function with other valid inputs combinations that may trigger various errors and/or that may cause the function to execute different operations or code.

TAS 120 may generate a second set of test cases 310-2 using a combinatorial test methodology, in which, the particular function is tested using all possible input combinations. The second set of test cases 310-2 and/or the combinatorial test methodology may provide an exhaustive testing of all possible input combinations of the particular function. Although not shown, the second set of test cases 310-2 may also include one or more test cases to test the particular function against invalid and/or negative inputs. The number of test cases produced by the combinatorial test methodology may grow exponentially based on the number of function arguments and/or argument inputs. As a result, combinatorial testing may be too time- and resource-intensive, and/or may be excessive because most, if not all, bugs, errors, and/or issues of particular function may arise without testing every possible combination of inputs.

TAS 120 may generate a third set of test cases 310-3 using a pairwise test methodology. According to the pairwise test methodology, the particular function may be tested using one occurrence of each pair of inputs. As illustrated in FIG. 3, the third set of test cases 310-3 includes four test cases that can be used to test the particular function with the first two parameters having values of 0 and 1, second and third parameters having values of 0 and 1, and first and third parameters having values of 0 and 1. Although the number of test cases of the third set of test cases 310-3 are fewer than those of second set of test cases 310-2, the third set of test cases 310-3 provide sufficient testing of the particular function albeit in a more efficient manner than second set of test cases 310-2. As another example, a function with 12 arguments and 2 test inputs for each argument may have 4096 test cases (e.g., $2^{12}$) when generating test cases with a combinatorial test methodology, and may have 4 test cases for the same function when generating test cases with a pairwise test methodology. For instance, assuming that the 2 test inputs have valid inputs of 0 and 1, the 4 test cases of {0,0,0,0,0,0,0,0,0,0,0,0}, {0,1,1,1,1,1,1,1,1,1,1,1}, {1,1,0,1,0,1,0,1,0,1,0,1}, and {1,0,1,0,1,0,1,0,1,0,1,0} cover each discrete combination of each pair of input parameters. Accordingly, in some embodiments, TAS 120 may select the pairwise test methodology to generate test cases for efficient testing and comprehensive testing of SUT 110 functions. It should be noted that TAS 120 may support additional and/or other test methodologies (e.g., an orthogonal test methodology) that produce different test cases based on the same parameters.

In some embodiments, TAS 120 may begin testing a function with a first set of test cases, that are generated via a first test methodology (e.g., non-combinatorial or pairwise test methodology), and if the number of detected issues satisfies or does not satisfy a threshold, TAS 120 may retest the function with a second set of test cases, that are generated via a second and more exhaustive test methodology (e.g., combinatorial test methodology). In this manner, TAS 120 may adapt the test cases according to the condition of SUT 110.

In some embodiments, TAS 120 may use the pairwise test methodology to generate test cases in order to efficiently validate functions of SUT 110 during the development phase of SUT 110. For instance, TAS 120 may use the pairwise generated test cases for a nightly validation of SUT 110, and/or to verify that existing functions operate as expected and have not changed from a previous build. TAS 120 may use the combinatorial test methodology to generate test cases to perform a full validation of SUT 110 against all possible use cases prior to a public release of SUT 110.

TAS 120 may convert the test cases that are generated from self-description 130 into executable code that can call the functions of SUT 110. TAS 120 may generate the executable code in one of several different programming languages or programming paradigms supported by SUT 110.

For instance, SUT 110 may be, or may include, an Application Programming interface ("API") that supports a Representational State Transfer ("REST") communication paradigm. In some such embodiments, TAS 120 may convert the test cases into a set of HyperText Transfer Protocol ("HTTP") GET, POST, PUT, and/or UPDATE messages. Each HTTP message may be used to call (e.g., HTTP POST) a specific function of the RESTful API, may provide (e.g., HTTP PUT) one or more inputs as part of the function call, and/or may receive (e.g., HTTP GET) the function output. Each message may include a Uniform Resource Locator ("URL") for identifying the API and/or API function under test. The URL may contain the function inputs as part of the URL query string. The function inputs may alternatively be included within the message header, payload, and/or a cookie file.

Other SUTs 110 may support the Simple Object Access Protocol ("SOAP"), JavaScript Object Notation ("JSON"), and/or other communication paradigms. In these instances, TAS 120 may convert the test cases into messages of the corresponding SOAP, JSON, and/or communication paradigm.

TAS 120 may also convert the test cases into executable code for testing C, C++, Java, Python, Perl, Ruby, other programming, and/or other scripting language functions. In these instances, SUT 110 may run on the same device as TAS 120. When on different devices, the executable code may be encapsulated in a data packet, and sent over a network to SUT 110 for execution.

TAS 120 may issue API calls and/or execute the test case code in order to test different functions of SUT 110 with different inputs. TAS 120 may capture output of each test case, and may compare the captured output against expected output in self-description 130 to determine which test cases were successfully completed and which test cases were unsuccessful. As unsuccessful test case may be a test case that produces unexpected output (e.g., output that is out of range of expected output), fails (e.g., SUT 110 crashes or produces no output), and/or produces behavior that is not expected.

TAS 120 may present a test summary with outputs of the executed test cases via a graphical user interface ("GUI"), a file, and/or other representation. The test summary may identify the successful test cases and/or unsuccessful test cases. The test summary may also provide the captured output relative to expected output specified in self-description 130.

Figure 4:
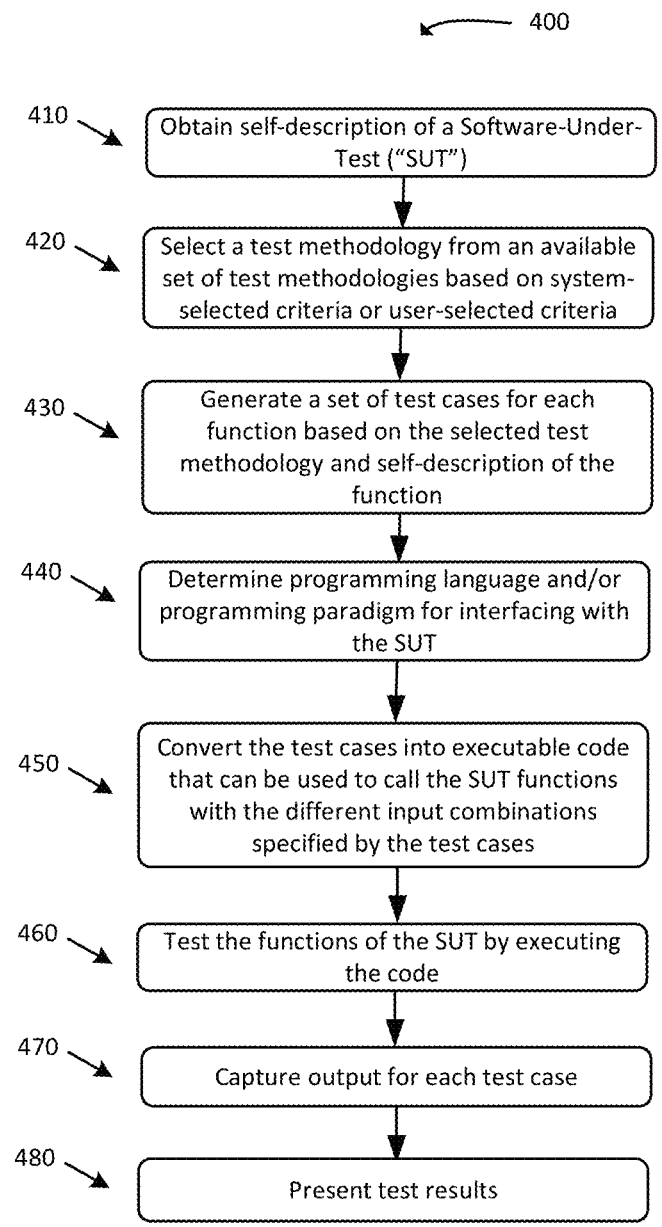
FIG. 4 presents a process for testing the SUT in accordance with some embodiments described herein.

FIG. 4 presents a process 400 for testing SUT 110 in accordance with some embodiments described herein. Process 400 may be performed by TAS 120. In particular, TAS 120 may perform process 400 to facilitate test driven development of SUT 110 by automatically generating test cases for functions of SUT 110 as the functions are written. The test cases can be changed to accommodate changes to the function declarations, and/or repeated for regression testing.

Process 400 may include obtaining (at 410) self-description 130 of SUT 110. As noted above, TAS 120 may obtain self-description 130 automatically by scanning one or more files (e.g., source files) that specify SUT 110. TAS 120 may use a crawler to periodically or continuously monitor SUT 110 for new function declarations and/or changes to existing function declarations. In response to detecting a new function declaration, TAS 120, by operation of the crawler, may extract the arguments and argument types from the function declaration. Additionally, TAS 120, by operation of the crawler, may identify test inputs for each argument and/or argument type based on predefined inputs for predefined and/or user-defined argument types. TAS 120 may also obtain self-description 130 via a self-description interface that allows a developer and/or tester to manually enter the SUT 110 functions for testing. In some embodiments, TAS 120 may automatically populate self-description 130 with the functions, function arguments, and argument types of SUT 110, and a user, via the self-description interface, may provide test inputs and/or expected outputs for each function.

Process 400 may include selecting (at 420) a test methodology from an available set of test methodologies based on system-selected criteria or user-selected criteria. The system-selected criteria may include selecting the test methodology based on the development and/or testing phase of SUT 110. For instance, SUT 110 may transition from a unit test phase, to an integration test phase, to a regression test phase, to an acceptance test phase, and different test methodologies may be used during one or more of these different test phases. The user-selected criteria may include a developer or tester specifying the test methodology for testing different SUTs 110.

Process 400 may include generating (at 430) a set of test cases for each function based on the selected test methodology and obtained self-description 130. The selected test methodology may define the set of test cases for a given function in self-description 130 based on one or more of the number of arguments, argument types, and/or test inputs for each argument or argument type of the function in self-description 130. More specifically, the selected test methodology may define each set of test cases with different input combinations from the test inputs provided for the arguments of a function.

Process 400 may include determining (at 440) the programming language and/or communication paradigm for programmatically interfacing with SUT 110. In some embodiments, the determination (at 440) may be based on the source code of SUT 110, the format of the function declarations, input and output format of SUT 110, and/or interface to SUT 110 (e.g., REST, SOAP, etc.).

Process 400 may include converting (at 450) the test cases into executable code that is supported by the determined (at 440) programming language and/or programming paradigm, and that can be used to call the SUT 110 functions with the different input combinations specified by the test cases. For example, TAS 120 may generate HTTP messages and/or messages supported by another network protocol to call functions of a RESTful API remotely via a data network.

Process 400 may include testing (at 460) the functions of SUT 110 by executing the code (e.g., generating the network messages and/or calling the functions), and may capture (at 470) output for each test case. Process 400 may include presenting (at 480) test results based on the captured output and/or comparing the captured output against expected output specified in self-description 130.

Figure 5:
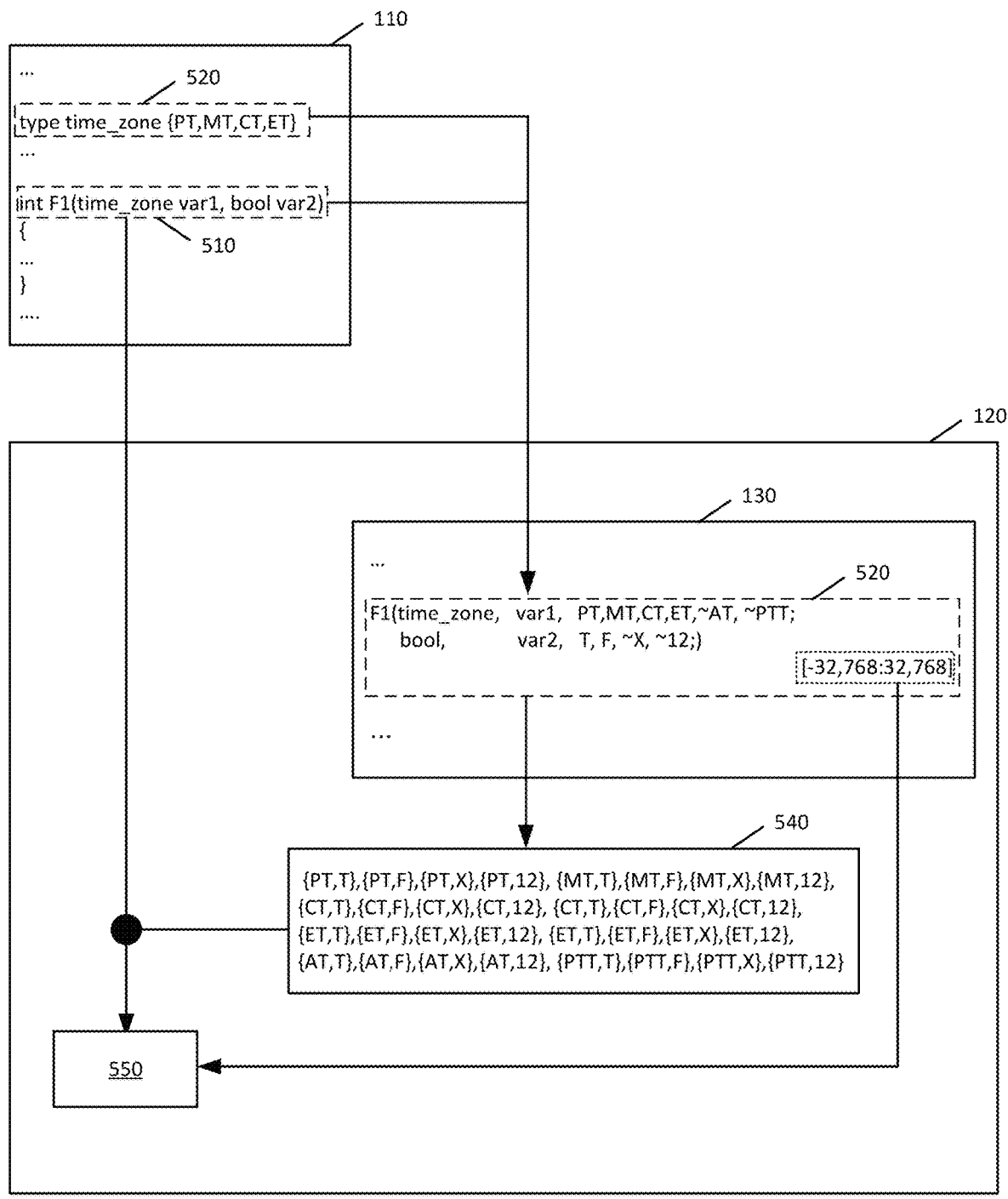
FIG. 5 presents an example of the TAS automatically creating test cases for a particular function of the SUT in accordance with some embodiments.

FIG. 5 presents an example of TAS 120 automatically creating test cases for a particular function of SUT 110 in accordance with some embodiments. As shown in FIG. 5, the source code of SUT 110 may include declaration 510 for the particular function. Declaration 510 may specify the function name, a first argument of custom-defined type "time_zone", a second argument of a predefined Boolean type, and a return argument of a predefined integer type.

TAS 120, via operation of the crawler, may scan the SUT 110 source code, may detect declaration 510, and may populate self-description 130 with entry 520 for the particular function based on declaration 510. The crawler may also detect that the first argument is of a custom-defined type by further scanning the SUT 110 source code to locate definition 530 for the "time_zone" argument type. Definition 530 may be specified with valid inputs "PT", "MT", "CT", and "ET" for arguments of the "time_zone" type.

TAS 120 may further populate each argument of entry 520 with test inputs based on definition 530, predefined values, and/or other data. For example, and as shown in FIG. 5, TAS 120 may populate the first argument for entry 520 with valid inputs that are detected for the first argument type based on definition 530 and two invalid inputs, and may populate the second argument for entry 520 with valid inputs that are predefined for the Boolean type and two invalid inputs, and may populate the return argument with valid inputs that are predefined for the integer type.

TAS 120 may generate test cases 540 for the particular function based on entry 520 in self-description 130. TAS 120 may convert test cases 540 into executable code that is used to call the particular function with a different input combination specified for each test case 540. Results 550 may include the output of each test case 540 and/or status of each test case 540. A successful or unsuccessful status may be derived from comparing the output from each function call to the expected output for the return argument.

In some embodiments, TAS 120 may perform a stateless testing of SUT 110, whereby each test case produces output that is independent of inputs or outputs from prior test cases or states of SUT 110. In some embodiments, TAS 120 may perform a stateful testing of SUT 110, whereby inputs and/or outputs of prior test cases may affect inputs and/or outputs of subsequent test cases. The stateful testing may verify that SUT 110 records state and applies the recorded state in correct circumstances.

In some embodiments, TAS 120 may provide stateful testing via Create, Read, Update, and Delete ("CRUD") test cases. The CRUD test cases may include creating an initial state within SUT 110 using a first set of inputs and a first function call, reading the initial state from SUT 110 using a second function call and/or based on output of the first function call, changing the initial state to a secondary state using a second set of inputs and the first function call or a third function call, and deleting the secondary state with a fourth function call.

Creating the initial state may include storing data in SUT 110. The data may be input to SUT 110 via a function call, wherein the data may be a parameter that is passed with the function call. The data may alternatively be the result of an operation that is executed by SUT 110 in response to a function call. SUT 110 may retain the operation result in memory or other storage.

Reading the initial state may include verifying that the initial state has been created and is stored in SUT 110 for subsequent access. Reading the initial state may include issuing a function call with a parameter for requesting the initial state from SUT 110.

Changing to the secondary state may include overriding data of the initial state with new data of the secondary state. Changing to the secondary state may also include executing an operation that use the data from the initial state to produce the data for the secondary state. For instance, creating the initial state may include a first mathematical operation, and changing to the secondary state may include using the result of the first mathematical operation as input to a second mathematical operation.

In some embodiments, self-description 130 may define a CRUD test case by setting expected output 230 of a function to a CRUD parameter. For instance, rather than set a range for expected output 230 of a particular function, self-description 130 may set expected output 230 to a CRUD parameter. TAS 120 may detect the CRUD parameter when generating the test cases, and may create at least two test cases for that particular function, wherein the first test case creates the initial state and verifies that the initial change is stored in SUT 110, and the second test case modifies the initial state.

TAS 120 may support other stateful testing of SUT 110. In some embodiments, self-description may include a conditional statement as part of expected output 230 for a function entry. The conditional statement may be specified as an "if-then-else" condition with expected output 230 specified for the conditional statement. For instance, the conditional statement may be defined as "if first output (e.g., from a first set of input parameters) is within first expected output, then provide second input parameters and verify second output against second expected output, else provide third input parameters and verify third output against third expected output. Multiple conditional statement may be nested within one another.

Figure 6:
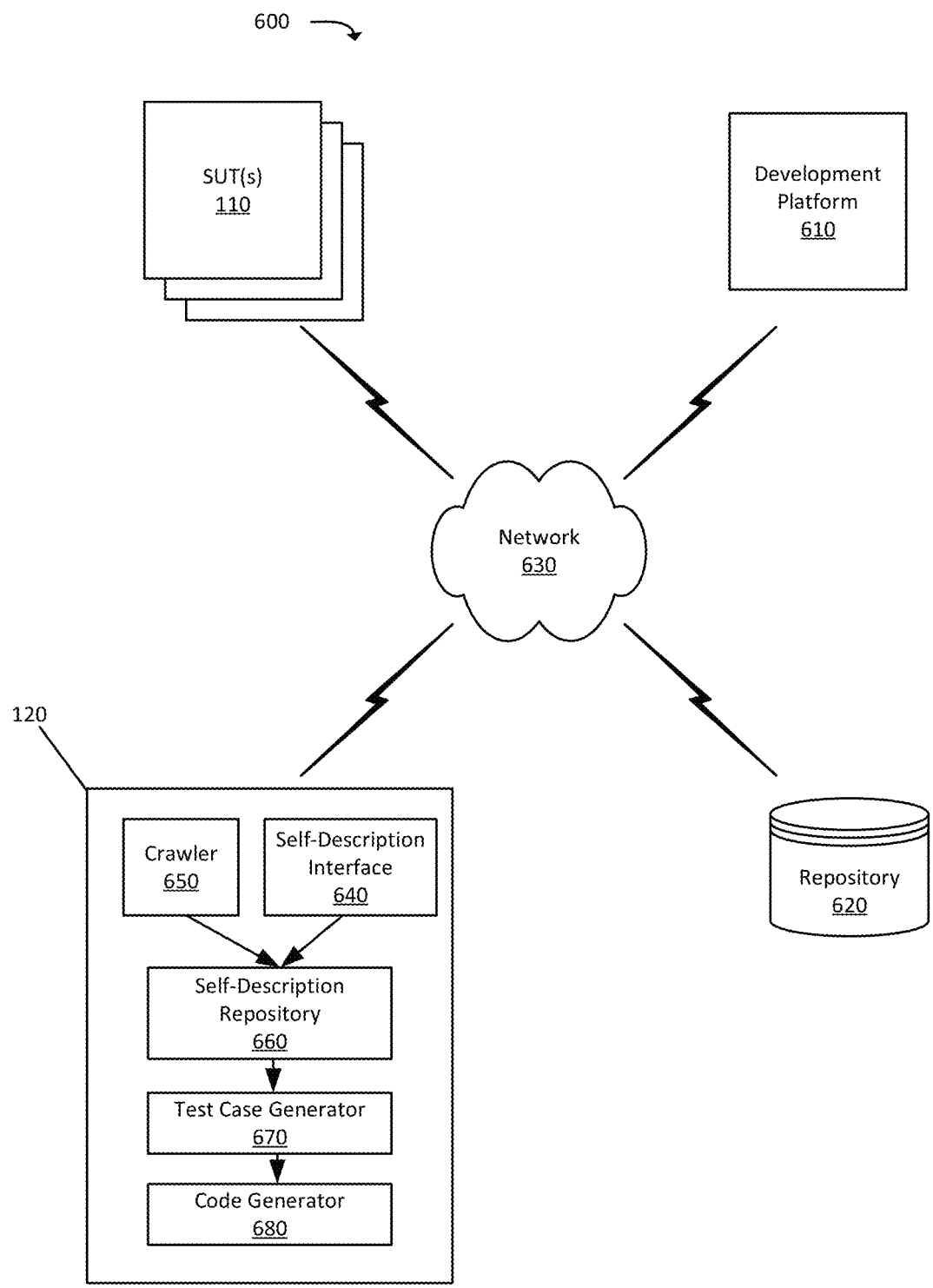
FIG. 6 illustrates an example environment in which one or more embodiments, described herein, may be implemented.

FIG. 6 illustrates an example environment 600 in which one or more embodiments, described herein, may be implemented. As shown in FIG. 6, environment 600 may include one or more SUT 110, TAS 120, development platform 610, repository 620, and network 630. TAS 120 may include self-description interface 640, crawler 650, self-description repository 660, test case generator 670, and code generator 680.

The quantity of devices, components, and/or networks, illustrated in FIG. 6, is provided for explanatory purposes only. In practice, environment 600 may include additional devices, components, and/or networks; fewer devices, components, and/or networks; different devices, components, and/or networks; or differently arranged devices, components, and/or networks than illustrated in FIG. 6. For example, while not shown, environment 600 may include devices, systems, and/or other physical hardware that facilitate or enable communication between various devices and/or components shown in environment 600, such as routers, modems, gateways, switches, hubs, etc. Alternatively, or additionally, one or more of the devices of environment 600 may perform one or more functions described as being performed by another one or more of the devices of environment 600. Devices of environment 600 may interconnect with each other and/or other devices via wired connections, wireless connections, or a combination of wired and wireless connections. In some implementations, one or more devices of environment 600 may be physically integrated in, and/or may be physically attached to, one or more other devices of environment 600. For instance, TAS 120 may be integrated as part of development platform 610.

SUT 110 may include any application, program, API, script, and/or code that contains machine-executable instructions. SUT 110 may include one or more files that are stored in repository 620. SUT 110 may execute from one or more devices. The devices executing SUT 110 may include one or more local machines (e.g., desktop computers, laptop computers, tablet devices, smartphones, etc.) of a user, and/or remote servers in the "cloud" that the user may access via network 630.

SUT 110 may be developed using development platform 610. Development platform 610 may provide a set of tools that assists developers in software development. For instance, development platform 610 may include one or more of an editor, compiler, run-time environment, and/or debugger. Development platform 610 may run on one or more local machines of the user. Development platform 610 may also run on remote servers in the "cloud" that the user may access via network 630. Developers may use a terminal interface (e.g., a browser, application, and/or client) on a local machine to access development platform 610 when development platform 610 runs in the cloud.

Development platform 610 may link to repository 620, and may use repository 620 for managing the files and/or code of SUT 110. For instance, repository 620 may allow multiple developers to check-out different files of an SUT 110 without conflict, and/or commit changed files back into repository 620 without conflict. Repository 620 may include one or more storage devices that run on the same or different machines than development platform 610 and/or TAS 120.

TAS 120 may be integrated with, or may have access to, development platform 610 and/or repository 620. Integrating TAS 120 as part of development platform 610 may allow for TAS 120 to monitor the coding of a particular SUT 110 in real-time (e.g., monitor the code as it is written using an editor of development platform 610). Based on the monitoring, TAS 120 may detect when a developer adds a function to the particular SUT 110 (e.g., declares the function prototype), and/or may modify self-description 130 for that particular SUT 110 to include an entry to test the added function. Similarly, integrating TAS 120 as part of repository 620 may allow TAS 120 to scan files of a particular SUT 110 that have been entered and/or committed to repository 620, detect functions of the particular SUT 110 from scanning the files, and/or modify self-description 130 for that particular SUT 110 to include entries for testing each detected function. TAS 120 may also access repository 620 to perform regression testing of SUT 110. For instance, TAS 120 may be configured to test each SUT 110 stored in repository 620 on a nightly basis.

TAS may include one or more devices (e.g., a server device or a distributed set of devices, such as a cloud computing system) that perform one or more actions described herein and/or that execute components 640-680 of TAS 120. Integration of TAS 120 with development platform 610 and/or repository 620 may include TAS 120 running on the same set of devices as development platform 610 and/or repository 620. Alternatively, TAS 120 may run on a different set of devices that remotely integrate with development platform 610 and/or repository 620 via network 630.

As shown in FIG. 6, TAS 120 may include self-description interface 640. TAS 120 may receive, via self-description interface 640, a user-defined self-description 130 for SUT 110 that is transmitted over network 630. For instance, a user (e.g., developer, tester, etc.) may upload self-description 130 for SUT 110 into TAS 120 via self-description interface 640. Self-description interface 640 may also provide an interface for manual modification of self-description 130. TAS 120 may store files for self-description 130 of different SUTs 110 to self-description repository 660. In other words, self-description may be stored in separate files than files of SUT 110.

In some embodiments, TAS 120 may automatically generate self-description 130 for different SUTs 110. In some such embodiments, a user may provide a link and/or identifier for SUT 110. The link may include a URL for accessing files of SUT 110 from development platform 610 and/or repository 620. TAS 120 may activate crawler 650 in response to receiving the link.

Within development platform 610, crawler 650 may monitor an identified SUT 110 in real-time. For instance, crawler 650 may monitor a file that a developer has open in developer platform 610, and may monitor changes the developer makes to the file. In particular, crawler 650 may scan the SUT 110 code for function declarations of the monitored SUT 110. Crawler 650 may detect a function declaration based on a function prototype or function interface definition that includes arguments of the function, the argument types, and/or acceptable inputs and/or input ranges defined for the argument types. Crawler 650 may create and/or open self-description 130 for the identified SUT 110 in self-description repository 660, and may populate self-description 130 with detected function names, arguments, argument types, and/or acceptable inputs and/or input ranges.

Crawler 650 may also access repository 620 in order to scan files of SUT 110 for function declarations. In this instance, developers may have committed the files to repository 620 after entering their changes. Accordingly, crawler 650 may scan the files, and may populate self-description 130 with the names, arguments, argument types, and/or acceptable inputs and/or input ranges of newly detected functions.

In some embodiments, crawler 650 may also scan the SUT 110 code for test inputs that can be used for detected arguments and/or argument types of one or more function declarations. For instance, crawler 650 may detect a function declaration that includes an argument of a particular type. Crawler 650 may scan elsewhere within the SUT 110 code to find a data structure or type declaration for that particular type. The data structure or type declaration may specify valid ranges and/or inputs for arguments of the particular type. For instance, a function declaration in SUT 110 may include an argument of type "time zone", and elsewhere in SUT 110 may be a data structure that enumerates values of type "time zone" to be "PT", "MT", "CT", and "ET". Test inputs for some argument types may be predefined by the programming language that is used to code SUT 110. In such cases, crawler 650 may map those test inputs to self-description 130, or may look for overriding of the argument types by the user.

TAS 120 may store self-description 130 for each SUT 110 in self-description repository 660. Test case generator 670 may be a process, component, and/or device of TAS 120 that generates test cases for each SUT 110 based on self-description 130 of that SUT 110. Test case generator 670 may be activated in response to a newly created or newly updated self-description 130. Test case generator 670 may access the newly created or newly updated self-description 130 from self-description repository 660, may select a test methodology (e.g., non-combinatorial, pairwise, combinatorial, and/or other test methodology), and may generate a set of test cases for each function that is identified in self-description 130 based on the selected test methodology.

Code generator 680 may receive the test cases from test case generator 670. Code generator 680 may determine the programming language and/or programming interface that may be used to call functions of SUT 110. Code generator 680 may convert the test cases to executable code that can be used to call the SUT 110 functions with different inputs defined for the different test cases. Code generator 680 may execute the converted code in order to call one or more of the SUT 110 functions with the different input combinations specified by the test cases. Code generator 680 may compile the outputs from each function call, and may present the outputs via a graphical user interface ("GUI"), a file, and/or other representation.

Network 630 may include one or more radio access networks ("RANs"), via which device and/or components of environment 600, may access one or more other networks or devices, a core network of a wireless telecommunications network, an Internet Protocol-based packet data network ("PDN"), a wide area network ("WAN") such as the Internet, a private enterprise network, and/or one or more other networks. In some implementations, network 630 may be, include, or be in communication with a cellular network, such as a Long-Term Evolution ("LTE") network, a Third Generation ("3G") network, a Fourth Generation ("4G") network, a Fifth Generation ("5G") network, a Code Division Multiple Access ("CDMA") network, etc. Network 630 may be connected to, and/or otherwise in communication with, one or more other networks, such as a public switched telephone network ("PSTN"), a public land mobile network ("PLMN"), and/or another network.

Figure 7:
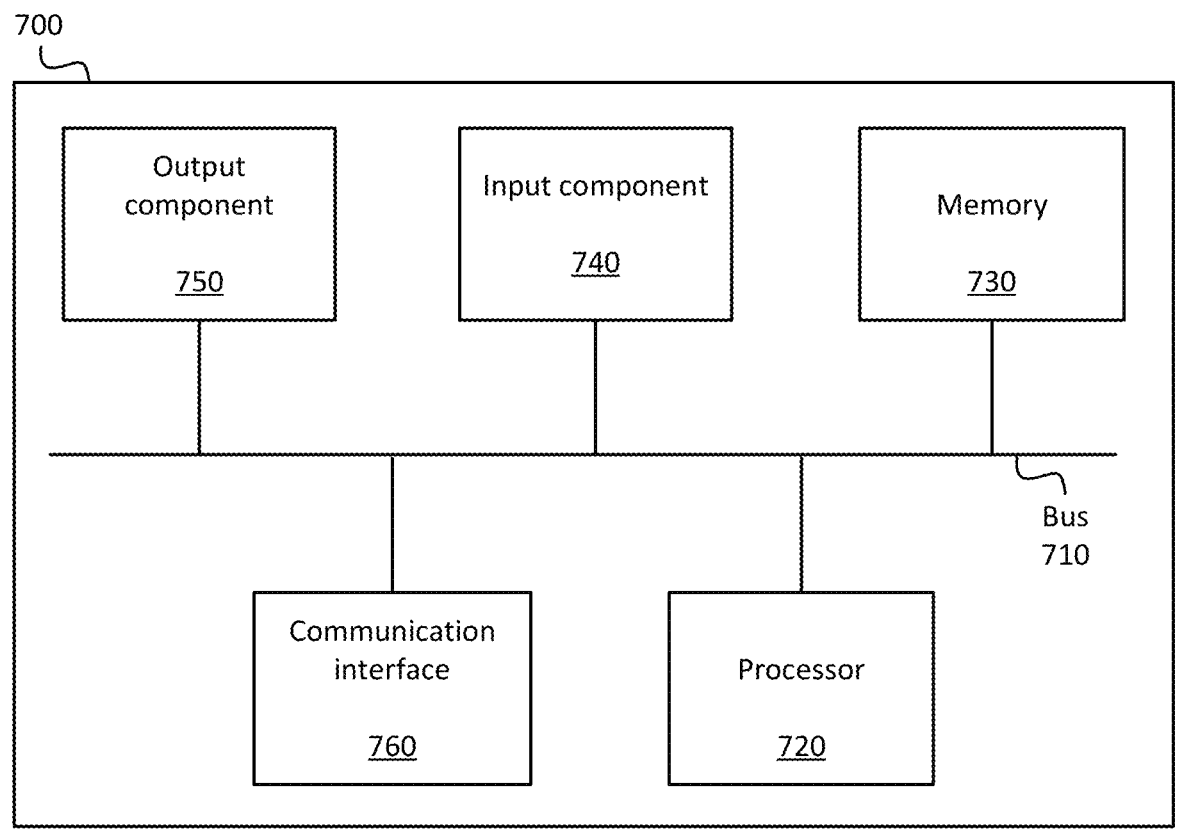
FIG. 7 illustrates example components of one or more devices, according to one or more embodiments described herein.

FIG. 7 is a diagram of example components of device 700. Device 700 may be used to implement one or more of the devices or systems described above (e.g., SUT 110, TAS 120, self-description interface 640, crawler 650, self-description repository 660, test case generator 670, code generator 680, etc.). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For instance, the devices may be arranged according to different peer-to-peer, private, permissioned, and/or other blockchain networks.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to FIGS. 1 and 4-6, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. For instance, TAS 120 may execute from a shared device that also executes development platform 510 and/or repository 520. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device comprising:
   a non-transitory computer-readable medium storing a set of processor-executable instructions; and
   one or more processors configured to execute the set of processor-executable instructions, wherein executing the set of processor-executable instructions causes the one or more processors to:
   scan a software-under-test ("SUT");
   detect one or more functions of the SUT in response to the scanning;
   generate a self-description based on a declaration of each of the one or more functions of the SUT, wherein the declaration specifies arguments and argument types of each function of the one or more functions;
   generate, based on the self-description, a set of test cases that provide different inputs to a function with one or more arguments and argument types that correspond to the arguments and the argument types of a particular function from the SUT; and
   perform programmatic testing of the SUT by issuing, to the particular function, different calls that include the different inputs from each test case of the set of test cases.

2. The device of claim 1, wherein the processor-executable instructions further include processor-executable instructions to:
   compare output resulting from each call to one or more expected output specified in the self-description; and
   provide a status for each test case of the set of test cases based on the comparing of the output, that results from the call of the test case, to the one or more expected output.

3. The device of claim 1, wherein the processor-executable instructions further include processor-executable instructions to:
   select from at least a first test methodology and a different second test methodology;
   wherein the processor-executable instructions to generate the set of test cases include processor-executable instructions to:
   produce a first set of test cases in response to selecting the first test methodology; and
   produce a different second set of test cases in response to selecting the second test methodology.

4. The device of claim 1, wherein the processor-executable instructions further include processor-executable instructions to:
   identify a definition of a particular argument type based on the scanning;
   determine a set of acceptable inputs for the particular argument type; and
   populate test input for the particular argument type in the self-description with the acceptable input.

5. The device of claim 1, wherein the processor-executable instructions further include processor-executable instructions to:
   determine a set of acceptable inputs for each argument of the particular function from the self-description; and
   wherein the processor-executable instructions to generate the set of test cases include processor-executable instructions to:
      produce a first subset of the set of test cases with different values for each argument of the particular function that satisfy the set of acceptable inputs; and
      produce a second subset of the set of test cases with at least one value for one or more arguments of the particular argument that does not satisfy the set of acceptable inputs.

6. The device of claim 1, wherein the processor-executable instructions further include processor-executable instructions to:
   determine a programming language that is used to programmatically call the one or more functions of the SUT;
   convert the set of test cases to code in the programming language; and
   wherein the processor-executable instructions to perform the programmatic testing include processor-executable instructions to:
      generate the different calls to the particular function in response to executing the code.

7. The device of claim 1, wherein the processor-executable instructions further include processor-executable instructions to:
   determine a communication interface that is used to remotely call the one or more functions of the SUT;
   convert the set of test cases to network messages supported by the communication interface;
   wherein the processor-executable instructions to perform the programmatic testing include processor-executable instructions to:
      generate the different calls to the particular function in response to providing the network messages to the SUT via a network.

8. A non-transitory computer-readable medium, storing a set of processor-executable instructions, which, when executed by one or more processors, cause the one or more processors to:
   scan a software-under-test ("SUT");
   detect one or more functions of the SUT in response to the scanning;
   generate a self-description based on a declaration of each of the one or more functions of the SUT, wherein the declaration specifies arguments and argument types of each function of the one or more functions;
   generate, based on the self-description, a set of test cases that provide different inputs to a function with one or more arguments and argument types that correspond to the arguments and the argument types of a particular function from the SUT; and
   perform programmatic testing of the SUT by issuing, to the particular function, different calls that include the different inputs from each test case of the set of test cases.

9. The non-transitory computer-readable medium of claim 8, wherein the processor-executable instructions further include processor-executable instructions to:
   compare output resulting from each call to one or more expected output specified in the self-description; and
   provide a status for each test case of the set of test cases based on the comparing of the output, that results from the call of the test case, to the one or more expected output.

10. The non-transitory computer-readable medium of claim 8, wherein the processor-executable instructions further include processor-executable instructions to:
    select from at least a first test methodology and a different second test methodology;
    wherein the processor-executable instructions to generate the set of test cases include processor-executable instructions to:
       produce a first set of test cases in response to selecting the first test methodology; and
       produce a different second set of test cases in response to selecting the second test methodology.

11. The non-transitory computer-readable medium of claim 8, wherein the processor-executable instructions further include processor-executable instructions to:
    identify a definition of a particular argument type based on the scanning;
    determine a set of acceptable inputs for the particular argument type; and
    populate test input for the particular argument type in the self-description with the acceptable input.

12. The non-transitory computer-readable medium of claim 8, wherein the processor-executable instructions further include processor-executable instructions to:
    determine a set of acceptable inputs for each argument of the particular function from the self-description; and
    wherein the processor-executable instructions to generate the set of test cases include processor-executable instructions to:
       produce a first subset of the set of test cases with different values for each argument of the particular function that satisfy the set of acceptable inputs; and
       produce a second subset of the set of test cases with at least one value for one or more arguments of the particular argument that does not satisfy the set of acceptable inputs.

13. The non-transitory computer-readable medium of claim 8, wherein the processor-executable instructions further include processor-executable instructions to:
    determine a programming language that is used to programmatically call the one or more functions of the SUT;
    convert the set of test cases to code in the programming language; and
    wherein the processor-executable instructions to perform the programmatic testing include processor-executable instructions to:
       generate the different calls to the particular function in response to executing the code.

14. The non-transitory computer-readable medium of claim 8, wherein the processor-executable instructions further include processor-executable instructions to:
    determine a communication interface that is used to remotely call the one or more functions of the SUT;

convert the set of test cases to network messages supported by the communication interface;

wherein the processor-executable instructions to perform the programmatic testing include processor-executable instructions to:

generate the different calls to the particular function in response to providing the network messages to the SUT via a network.

15. A method comprising:

scanning a software-under-test ("SUT");

detecting one or more functions of the SUT in response to the scanning;

generating a self-description based on a declaration of each of the one or more functions of the SUT, wherein the declaration specifies arguments and argument types of each function of the one or more functions;

generating, based on the self-description, a set of test cases that provide different inputs to a function with one or more arguments and argument types that correspond to the arguments and the argument types of a particular function from the SUT; and performing programmatic testing of the SUT by issuing, to the particular function, different calls that include the different inputs from each test case of the set of test cases.

16. The method of claim 15, further comprising:

comparing output resulting from each call to one or more expected output specified in the self-description; and providing a status for each test case of the set of test cases based on the comparing of the output, that results from the call of the test case, to the one or more expected output.

17. The method of claim 15, further comprising:

selecting from at least a first test methodology and a different second test methodology;

wherein generating the set of test cases comprises:

producing a first set of test cases in response to selecting the first test methodology; and producing a different second set of test cases in response to selecting the second test methodology.

18. The method of claim 15, further comprising:

identifying a definition of a particular argument type based on the scanning;

determining a set of acceptable inputs for the particular argument type; and populating test input for the particular argument type in the self-description with the acceptable input.

19. The method of claim 15, further comprising:

determining a set of acceptable inputs for each argument of the particular function from the self-description; and wherein generating the set of test cases comprises:

producing a first subset of the set of test cases with different values for each argument of the particular function that satisfy the set of acceptable inputs; and producing a second subset of the set of test cases with at least one value for one or more arguments of the particular argument that does not satisfy the set of acceptable inputs.

20. The method of claim 15, further comprising:

determining a programming language that is used to programmatically call the one or more functions of the SUT;

converting the set of test cases to code in the programming language; and wherein performing the programmatic testing comprises:

generating the different calls to the particular function in response to executing the code.

\* \* \* \* \*